United States Patent [19]

Dietmar et al.

[11] Patent Number: 5,026,809

[45] Date of Patent: * Jun. 25, 1991

[54] LEWIS BASE ADDUCTS OF DECARBORANE FOR FORMING NEW PRECERAMIC POLYMERS, USING AS BINDERS, FORMING SHAPED BODIES AND FORMING FIBERS

[75] Inventors: Seyferth Dietmar, Lexington; William S. Rees, Jr., Arlington, both of Mass.

[73] Assignee: Massachusetts Institute of Technology, Cambridge, Mass.

[ * ] Notice: The portion of the term of this patent subsequent to Oct. 3, 2006 has been disclaimed.

[21] Appl. No.: 361,019

[22] Filed: Jun. 2, 1989

Related U.S. Application Data

[63] Continuation-in-part of Ser. No. 65,224, Jun. 22, 1987, Pat. No. 4,871,826.

[51] Int. Cl.$^5$ ..................... C08G 79/08; C01B 35/14; C04B 35/58
[52] U.S. Cl. ........................ 528/4; 423/276; 423/284; 423/285; 423/294; 501/96
[58] Field of Search .................... 528/4; 423/276, 284, 423/285, 294; 501/96

[56] References Cited

U.S. PATENT DOCUMENTS 3,344,108 9/1967 Drinkard, Jr. .......................... 528/4
3,453,092 7/1969 Hawthorne et al. ................. 423/284
3,455,661 7/1969 Hough et al. ........................ 423/284
4,871,826 10/1989 Seyferth et al. ........................ 528/4

FOREIGN PATENT DOCUMENTS 0311935 10/1971 U.S.S.R. .................................. 528/4

Primary Examiner—John Kight, III
Assistant Examiner—Kathryne E. Shelborne
Attorney, Agent, or Firm—George W. Neuner; Ronald I. Eisenstein

[57] ABSTRACT

Preceramic polymers formed by reacting $B_{10}H_{14-n}R_n$, (where R is a lower alkyl group having from 1 to about 8 carbon atoms, a substituted or unsubstituted cycloalkyl group having from 3 to about 8 carbon atoms, a substituted or unsubstituted lower alkenyl group having from 2 to about 8 carbon atoms, or a substituted or unsubstituted lower aryl group having from 6 to about 10 carbon atoms, and n is a number from zero to about six) with a diamine of the formula

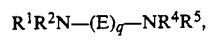

where $R^1$, $R^2$, $R^4$ and $R^5$ are H, a lower alkyl group having from 1 to about 8 carbon atoms, a substituted or unsubstituted cyloalkyl group having from 3 to about 8 carbon atoms, a substituted or unsubstituted lower alkenyl group having from 2 to about 8 carbon atoms, a substituted or unsubstituted lower aryl group having from 6 to about 10 carbon atoms, or a di- or triorganosilyl group and E is a substituted or unsubstituted heteroatom selected from the elements in Periodic Groups 2 through 15, lanthanide and actinide families, are soluble in organic solvents.

20 Claims, No Drawings

LEWIS BASE ADDUCTS OF DECABORANE FOR FORMING NEW PRECERAMIC POLYMERS, USING AS BINDERS, FORMING SHAPED BODIES AND FORMING FIBERS

The U.S. government has rights in this invention pursuant to Grant Number N00014-85--K-0645 award by the Department of the Navy.

The present invention is a continuation-in-part of Ser. No. 065,224 U.S. Pat. No. 4,871,826 filed June 22, 1987, now allowed.

This invention is directed to using Lewis base adducts of decaborane (hereinafter sometimes referred to as Lewis base adducts) (1) for preparing preceramic polymers containing boron, and their pyrolysis to ceramic materials; (2) their use as a binder for ceramic powders with subsequent pyrolysis to form a ceramic body; (3) their use in the formation of shaped objects with subsequent pyrolysis to give a ceramic material of the same shape; and (4) their use in forming polymer fibers whose subsequent pyrolysis yields ceramic fibers.

There is a large amount of interest in boron-containing ceramic materials, boron carbide, $B_4C$, boron nitride, BN, boron phosphides, BP, $B_{12}P_2$, and $B_{13}P_2$, aluminum boride, $AlB_{12}$, boron silicides $B_4Si$, $B_6Si$ and $B_{12}Si$, and the transition metal borides because of their outstanding chemical and/or physical properties [See R. Thompson, "The Chemistry of Metal Borides and Related Compounds", in "Progress in Boron Chemistry", Vol. 2. R.J. Brotherton and H. Steinberg, ed., Pergamon, London, 1970, pp. 173-230; A Meller in "Gmelin Handbuch der Anorganischen Chemie", "Boron Compounds, 1st supplement Vol. 2: Boron and Nitrogen, Halogens" (German); K. Niedenzu and K.C. Buschbeck, ed., Springer-Verlag, Berlin, 1989 pp. 1-69].

Three distinct phases of composition $B_{1.0}N_{1.0}$ are known. Hexagonal boron nitride exists either as the less dense graphite structure or the more dense wurtzite form. Cubic boron nitride adopts the zinc blende structure The wurtzite form is produced from the graphite form by application of greater than 50 atmospheres of pressure. It reverts back upon being heated at temperatures of 1000° C. or higher. A paucity of data exist on its properties; hence the term "hexagonal" is used to refer to graphitic. Cubic BN either may be prepared directly (>55 atm. pressure $B_2O_3$ +metal nitride) or by treatment of hexagonal BN at 60 atm. and 1800° C. Under such conditions, the cubic form is thermodynamically favored over the hexagonal form; however, like the diamond form of carbon, at ambient pressure it is disfavored, yet kinetically persists. Many different substances have been shown to catalyze the phase conversion from hexagonal to cubic. Among these are water, ammonium salts, metal borides, nitrides and silicides and various pure metals. Commercially the most often employed are the nitrides of either lithium or magnesium. Many different methods exist for the preparation of hexagonal BN. The one employed industrially uses the reaction of $B_2O_3$ with urea.

Hexagonal BN has a density of 2.27 g/cm³, cubic BN one of 3.48 g/cm³. At temperatures greater than 1950° C. under vacuum hexagonal BN will decompose to the elements. At 2500° C. at ambient pressure it sublimes. The reported melting point of 3000° C. was measured under a high nitrogen overpressure. Due to its sheet-like structure, with boron atoms in one layer sandwiched between nitrogen atoms in the layers above and beneath, hexagonal BN is widely used as a high temperature lubricant, the active mode being plane slippage. Both commonly found forms of BN are exceptional electrical insulators. The resistivity of hexagonal BN is $10^{18} \Omega cm$. Cubic BN is easily doped with impurities to produce a semiconductor. The band gap in undoped material is 3.8.5.8 eV.

The primary use of cubic BN is as an abrasive, as grinding wheels for metals and metal alloys and as cutting tools for hard steels and tough high temperature nickel alloys. Hexagonal BN forms a surface layer of $B_2O_3$ in the presence of $O_2$ at 800° C., thus protecting itself from further bulk oxidation. This thermal protection barrier makes BN fibers attractive candidates to replace carbon for some uses. Hexagonal BN is not wetted by most molten metals; thus it is useful as a reinforcement matrix for metal-ceramic composites. However, it reacts with some metals at high temperatures to produce the metal nitride and elemental boron. Its low coefficient of thermal expansion makes the hexagonal form useful for crucibles and other items that must resist thermal shock.

Boron nitride fibers have been made by nitridation of $B_2O_3$ fibers. The melting point of BN makes it impractical to melt spin fibers; alternatively, $B_2O_3$ may be easily melt spun into fibers. Another method for formation of BN fibers is CVD upon tungsten wire from $BF_3$ and $NH_3$ at 1200° C. and 35 torr. A high degree of anisotropy exists with the strength of hexagonal BN. Cubic BN is the second hardest substance known (Knoop hardness: diamond. 9000 kg/mm²; BN, 4500; sapphire, 2100). For polycrystalline cubic samples, a Vickers microhardness approaching 8000 kg/mm² has been measured. Due to its high chemical resistance, protective coatings of BN have been employed to increase the inertness of both carbon and metal substrates. In general, this has been accomplished via CVD, although one may sublime BN onto a substrate in high vacuum employing a laser as a heat source.

It would be useful to have a polymer precursor for BN that can be readily formed, and is stable at room temperature. Additionally, it should be a processible precursor, i.e., one that is soluble in organic solvents and/or fusible. A further requirement is that the ceramic precursor give a high yield (>60%) of ceramic residue on pyrolysis. High ceramic yields minimize shrinkage on pyrolysis and the destructive effect of evolved volatiles on the ceramic microstructure.

It would also be useful to have a polymeric ceramic precursor having a melting point below 350° C. for certain applications such as forming fibers. Also, good solubility in volatile organic solvents is desirable.

It would also be useful to have methods for using certain readily available boron-containing compounds whose pyrolysis under appropriate conditions gives a ceramic material containing boron nitride as the major constituent. Such preceramic materials would be useful:
(1) in the preparation of ceramic fibers;
(2) in the preparation of ceramic coatings, particularly on otherwise oxidizable materials and as a passivation barrier between ceramic interfaces.
(3) as binders for boron nitride and other ceramic powders; and
(4) in forming into shaped bodies whose subsequent pyrolysis gives a ceramic material of the same shape.

SUMMARY OF THE INVENTION

We have now discovered soluble preceramic boron-containing polymers of type $[B_{10}H_{12-n}R_n \cdot R^1R^2N \cdot (E)q \cdot NR^4R^5]_x$ where x is greater than 1. These polymers are formed by reacting $B_{10}H_{14-n}R_n$, (where R is a lower alkyl group having from 1 to about 8 carbon atoms, a substituted or unsubstituted cycloalkyl group having from 3 to about 8 carbon atoms, a substituted or unsubstituted lower alkenyl group having from 2 to about 8 carbon atoms, or a substituted or unsubstituted lower aryl group having from 6 to about 10 carbon atoms, and n is a number from zero to about six) with the diamine $R^1R^2N \cdot (E)q \cdot NR^4R^5$, in which the bridging group. E, does not contain a terminal C-N bond, in an organic solvent. $R^1$, $R^2$, $R^4$ and $R^5$ are H, a lower alkyl group having from 1 to about 8 carbon atoms, a substituted or unsubstituted cycloalkyl group having from 3 to about 8 carbon atoms, a substituted or unsubstituted lower alkenyl group having from 2 to about 8 carbon atoms, a substituted or unsubstituted lower aryl group having from 6 to about 10 carbon atoms. or a di- or triorganosilyl group. $R^1$, $R^2$, $R^4$ and $R^5$ can be the same or different. Preferably, $R^1$ and $R^2$ are the same, and $R^4$ and $R^5$ are the same. E, the difunctional bridging group is a heteroatom with or without substituents. E can be any element from Periodic Groups 2 through 15, as well as from the lanthanide and actinide families. Substituents on E can be H, a lower alkyl group having from 1 to about 8 carbon atoms, a substituted or unsubstituted cycloalkyl group having from 3 to about 8 carbon atoms, a substituted or unsubstituted lower alkenyl group having from 2 to about 8 carbon atoms, a substituted or unsubstituted cycloalkenyl group having from 3 to about 8 carbon atoms, a substituted or unsubstituted lower alkynyl group having from 2 to about 8 carbon atoms, a substituted or unsubstituted lower aryl group having from 6 to about 10 carbon atoms, a substituted or unsubstituted heterocyclic group having 5 to about 18 carbon atoms, an amino group, an alkoxy group, etc.

Preferably E is Si, B, Ge or Al.

$(E)_n$ can be a cyclic such as in some of the following diamines, where $R^1$ and $R'$ are defined as $R^1$, $R^2$, $R^3$ and $R^4$ and ORG=R, a difunctional alkylene, alkenylene, alkynylene, heteroatom (e.g. O, N, S, etc.), heteroatom substituted R, or ORG may not be present. Preferably, ORG either is not present or is a bridging group such as $(CH_2)_n$, where n=1 or 2, 0, or NR:

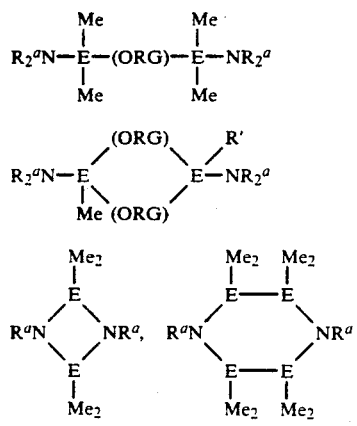

In addition hybrid diamines such as

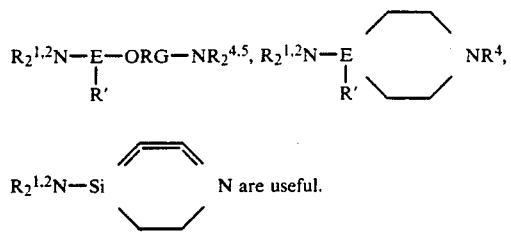

 N are useful.

Preferably, $(E)_n$ is not cyclic.

DETAILED DESCRIPTION OF THE INVENTION

In U.S. U.S. Pat. No. 4,871,826 we disclosed that reacting decaborane compounds of the formula $$B_{10}H_{14-n}R_n,$$

wherein R is a lower alkyl group having from 1 to about 8 carbon atoms, a substituted or unsubstituted cycloalkyl group having from 3 to about 8 carbon atoms,. a substituted or unsubstituted lower alkenyl group having from 2 to about 8 carbon atoms, or a substituted or unsubstituted lower aryl group having from 6 to about 10 carbon atoms and n is a number from 0 to about 6, with a diamine, preferably an organic or organometallic-bridged diamine, in an organic solvent results in soluble preceramic polymers that have many applications. These preceramic polymers typically will provide a ceramic material in a high yield (typically greater than 60%) upon pyrolysis. These yields are desired to minimize shrinkage on pyrolysis and the destructive effect of evolved volatiles on the ceramic microstructure. Further, this preceramic polymer is a processible precursor, i.e., one that is soluble in organic solvents and/or fusible. The preceramic polymers disclosed are typically soluble in polar organic solvents such as dimethyl sulfoxide (DMSO), N,N-dimethylformamide (DMF), acetonitrile. acetone and hexamethylphosphoric triamide (HMPA).

A preferred embodiment involved the preceramic polymer formed where the diamine used has the formula:

$$R^1R^2N\text{-}R^3\text{-}NR^4R^5,$$

wherein $R^1$, $R^2$, $R^4$ and $R^5$ are H, a lower alkyl group having from 1 to about 8 carbon atoms, a substituted or unsubstituted cycloalkyl group having from 3 to about 8 carbon atoms, a substituted or unsubstituted lower alkenyl group having from 2 to about 8 carbon atoms, a substituted or unsubstituted lower aryl group having from 6 to about 10 carbon atoms, or a di- or triorganosilyl group, $R^1$, R2, $R^4$ and $R^5$ can be the same or different.

The bridging $R^3$ is a lower alkylene group having from 1 to about 8 carbon atoms, a substituted or unsubstituted cycloalkylene group having from 3 to about 8 carbon atoms, a substituted or unsubstituted lower alkenylene group having from 2 to about 8 carbon atoms, a substituted or unsubstituted lower arylene group having from 6 to about 10 carbon atoms, a substituted or unsubstituted polyarylene group, a heteroatom-containing (e.g.. O, N, Si, metal, etc.) alkylene, cycloalkylene, alkenylene or arylene group. $R^3$ also could be absent. For example, $R^3$ includes

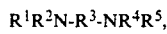

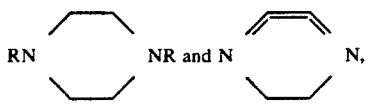

We have now discovered that the soluble preceramic boron-containing polymers wherein decaborane compounds of the formula $B_{10}H_{14-n}R_n$ (where R and n are defined as above) are reacted with diamines of the class $R^1R^2N.(E)q.NR^4R^5$ typically have either lower melting points and/or greater solubility in organic solvents than do the preceramic boron-containing polymers of the type
$[B_{10}H_{12-n}R_n-R^1R^2N-R^3-NR^4R^5]_x$.

In the diamine of the formula:

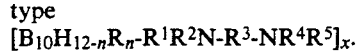

$R^1$, $R^2$, $R^4$ and $R^5$ are as defined above. Preferably, $R^1$ and $R^2$ are the same, and $R^4$ and $R^5$ are the same. More preferably, $R^1$, $R^2$, $R^4$ and $R^5$ are lower alkyl groups. Most preferably, they are $CH_3$.

E, the difunctional bridging group is a heteroatom with or without additional substituents. E can be any element from Periodic Groups 2-15, as well as from the lanthanide and actinide families. The presence or absence of further substituents on E will be determined by the valence of E. Typically, that valence will be from II to V. depending on the element. For example, when E is Zn, there will be no substituents, whereas when E is B. there will be one further substituent. When E is Si, there will be two, when E is P, there will be one ($P^{III}$) or three ($P^V$) and so forth.

The substituents on E can be H, a lower alkyl group having from 1 to about 8 carbon atoms, a substituted or unsubstituted cycloalkyl group having from 3 to about 8 carbon atoms, a substituted or unsubstituted lower alkenyl group having from 2 to about 8 carbon atoms, a substituted or unsubstituted cycloalkenyl group having from 3 to about 8 carbon atoms, a substituted or unsubstituted lower alkynyl group having from 2 to about 8 carbon atoms, a substituted or unsubstituted lower aryl group having from 6 to about 10 carbon atoms a substituted or unsubstituted heterocyclic group having from 5 to about 18 carbon atoms, an amino group of the type $NR_2$, an alkoxy group, OR, having from 2 to about 10 carbon atoms, etc.

In the diamine "q" preferably will be 1. It can be 2, as in $R^1R^2NE(sub)E(sub)NR^1R^2$, where sub is a substituent of E as defined above, for example, $Me_2NSiMe_2$-$SiMe_2NMe_2$. In addition, "q" can be greater than 2. Where "q" is 2 or greater. different E's can be present. For example, $R^1R^2$-$(E)q$-$(E^1)q$-$NR^4R^5$, where $E^1$ is defined as E and $q^1$ is 1 to 3, and $E^1 \neq E$. The E's can be linked directly together or linked through another atom or group. For example, in $R^1R^2NSi$-$X$-$SiNR^4R^5$ (e.g. $Me_2NSiMe_2$-$X$-$SiMe_2NMe_2$), X could be O, S, NR, $(CH_2)_r$, r=1 or more, alkenyl, alkynyl, etc.

Preferably E is Si, B, Ge or Al.

$(E)_n$ can be linear or cyclic, as in the following diamines where $R^a$ and $R'$ are defined as $R^1$, $R^2$, $R^3$ and $R^4$ and ORG=R, a difunctional alkylene, alkenylene, alkynylene, a heteroatom (e.g., O, N, S, etc.), heteroatom substituted R, or org may not be present. Preferably, ORG either is not present or is a bridging group such as $(CH_2)_n$ where n=1-6, preferably, 1-2, more preferably n=1, 0, or NR:

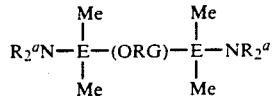

1.

2.

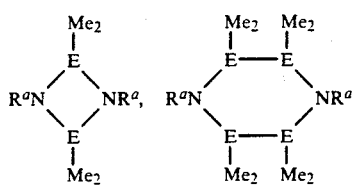

3.

E is preferably Si.

In addition hybrid diamines such as

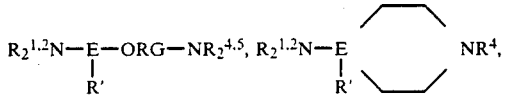

  N are useful.

Preferably, $(E)_n$ is not cyclic.

In addition, E can be linked directly to one of the diamines but not to the other. In this case it is linked to another group, for example, an organo linker group such as $R^3$, which in turn is linked to the other diamine, e.g. N.E.(organo linker group).N.

Preferably E is silicon, boron, aluminum and germanium, more-preferably it is silicon. Preferred substituents are lower alkyl, hydrogen and vinyl.

These materials can be reacted with a decaborane of the formula $B_{10}H_{14-n}R_n$ in any organic solvent in which they are soluble and with which they do not react, for example, diethyl ether, tetrahydrofuran (THF), hexane, toluene, etc. The decaborane and the diamine are allowed to remain in solution for a time sufficient for them to react to form the preceramic polymer. Preferably, the solution is stirred by a means well known to a person of ordinary skill in the art. The temperature and time allowed for reaction will vary depending upon the particular reactants used and the reaction solvent, and can be determined empirically based upon the present disclosure.

The temperature used is preferably below about 165° C. More preferably, it is below about 110° C. Still more preferably, the reaction temperature is below about 80° C.

We have found that the preceramic polymers obtained by the above process typically have lower melting points and/or greater solubility in organic solvents than do the preceramic polymers of the formula $[B_{10}H_{12}.R^1R^2N-R^3-NR^4R^5]_x$. Thus, these preceramic polymers can be especially useful in certain applications such as fiber formation, for instance, melt-spinning of fibers.

The amount of decaborane to diamine that is added to the solvent can vary over a wide range. This amount can be empirically determined by the person of ordinary skill in the art, based upon the present disclosure. Preferably, the diamine is added to the decaborane in a molar ratio ranging from 20:1 to 1:20. more preferably, it is added in an amount ranging from about 2:1 to 1:2 mole ratio and most preferably, it is added in an amount of about 1 to 1 mole ratio.

The $[B_{10}H_{12-n}R_n.R^1R^2N\text{-}(E)q\text{-}NR^4R^5]_x$ preceramic polymer is formed from the reaction of $$xB_{10}H_{12-n}R_n + xR^1R^2N\text{-}(E)q\text{-}NR^4R^5 \rightarrow$$

$$[[B_{10}H_{12-n}R_n.R^1R^2N\text{-}(E)q\text{-}NR^4R^5]_x + xH_2H_2.$$

For example, where the diamine is a silicon amine such as $R^6(CH_3)Si(NMe_2)_2$, where $R^6=H$, $CH_3$, $CH=CH_2$, it can be reacted with $B_{10}H_{14}$ in an organic solvent, such as benzene. The reactants can be mixed at ambient temperature and, subsequently, the reaction mixture heated at reflux for some hours. The polymers produced in this instance are formed as shown below:

$$xB_{10}H_{14} + xR^6(CH_3)Si(NMe_2)_2 \longrightarrow$$

$$xH_2 + [B_{10}H_{12}.Me_2NSiR^6(CH_3)NMe_2]_x.$$

These polymers are yellow to orange solids which are not soluble in aliphatic hydrocarbons and are partially soluble in aromatic hydrocarbons and soluble in polar organic solvents such as N,N-dimethylformamide (DMF) and acetonitrile (MeCN). These polymers melt at temperatures below 200° C. Molecular weights have not been determined but the polymers are typically more soluble than the $[B_{10}H_{12}.R^1R^2N.R^3.NR^4R^5]_x$ polymers.

Another example of such an element amine is tetrakis(dimethylamino)diborane, $(Me_2N)_2B.B(NMe_2)_2$. A reaction of this element diamine with $B_{10}H_{14}$ in 1:1 molar ratio in an organic solvent, such as diethyl ether, gave a yellow, resinous solid which melted in the range 70–83° C. and was soluble in acetone and acetonitrile. Its combustion analysis was in agreement with the composition $[B_{10}H_{12}.(Me_2N)_2B.B(NMe_2)_2]_x$. This product did not react with addition $B_{10}H_{14}$, even in boiling benzene.

In general, the materials formed in the reactions outlined above are not pure, homogeneous polymers in the case of the silicon-containing amine-linked products. Evidence was found in the spectral characterization of the products for the presence of three different species. The major component is that described above, but other components also are present in minor amounts, namely $Me_2NH.B_{10}H_{12}.HNMe_2.HNMe_2$ and $B_{10}H_{12}(SiMe_2)$.

The preceramic polymers are soluble in polar organic solvents. They typically form a melt when heated at temperatures below 200° C., which makes them particularly suitable for uses such as melt-spinning. They appear to be oxidatively stable but are hydrolytically unstable at room temperature. They are useful as ceramic precursors, preferably as starting materials for the preparation of boron nitride fibers and coatings.

The methods described herein generally result in the formation of soluble preceramic polymers in high yields. Pyrolysis of these polymers to temperatures greater than 650° C., more preferably, greater than 1000° C. results in a ceramic material. Preferably, the pyrolysis is carried out under an inert gas, such as argon or nitrogen. However, depending upon the particular diamine used, pyrolysis under a reactive gas, such as ammonia, may be desirable. This can readily be determined by the person of ordinary skill in the art based upon the present disclosure They are useful in forming boron-containing ceramics such as boron nitride and boron carbonitride.

Ceramic yields for materials are determined by thermogravimetric analysis (TGA), for example, heating to 950° C. at 10° C./min, in an inert atmosphere such as an argon stream. The TGA traces showed that typically with these polymers all of the weight loss occurred below the 500–600° C. range. The ceramic residues (of bulk pyrolyses in a stream of argon) were characterized by diffuse reflectance Fourier transform infrared spectroscopy (DRIFT), X-ray powder diffraction (XRD) and elemental analysis after having been heated to 1000° C. and to 1500° C.

The samples had DRIFT bands at 2500cm$^{-1}$ which are attributable to the presence of residual B-H bonds, still present after wiring to 1000° C. These bands were not observed after the samples had been heated to 1500° C. All DRIFT bands observed in samples heated to 1500° C. were attributable to ceramic materials. The crystalline phases identified by XRD as present after firing to 1500° C. for materials derived from main group element amino-containing polymers were BN and $B_4C$. The samples pyrolyzed under argon tended to have an excess of boron, relative to the other elements present in the ceramic blend. This can be changed depending upon the particular element diamine used.

The element diamine polymers can undergo different reactions in a reactive atmosphere. For example, the organosilicon amine-derived polymers undergo thermally-induced chemistry during pyrolysis under an ammonia atmosphere and, as a result, the bulk of the silicon is not retained in the ceramic residue. The resulting ceramic residue thus is virtually pure BN, generally containing <10% silicon by weight and often <5%. The ceramic yields obtained in such pyrolyses carried out in a stream of ammonia can be very high. For example in the preceramic polymer $[B_{10}H_{12}.Me_2NSiMe_2NMe_2]_x$, if all boron atoms of the decaborane cage are converted to BN, there will be an uptake of 10 N atoms (140 g per mole of polymer unit) and a loss of 12 H atoms and the linker molecule (158 g per mole of polymer unit) giving a theoretical ceramic yield of 93% (found: 89% on heating to 1000° C.).

Additionally, it is possible to prepare preceramic polymers containing mixtures of the decaborane and different diamines with "$R_3$" and "E" linkers, resulting in a hybrid polymer containing both diamines Also, mixtures of
$[B_{10}H_{12}.R^1R^2N\text{-}(E)q\text{-}NR^4R^5]_x$ with
$[B_{10}H_{12}.R^1R^2N\text{-}R^3\text{-}NR^4R^5]_x$ and/or
$[B_{10}H_{12}.R^1R^2N\text{-}(E')_{1l}\text{-}NR^4R^5]_x$,
where E' is defined as E but is not the same as E, and q=1 to 3 may be prepared and copyrolyzed. These hybrid polymers and polymer mixtures can preferably be used as binders, in forming shaped bodies, and in forming fibers.

The decaborane-element diamine polymers disclosed herein are very useful in the preparation of boron nitride fibers. For example, the
$[B_{10}H_{12}.Me_2NSiMe_2NMe_2]_x$ and
$[B_{10}H_{12}.Me_2NSiMe(H)NMe_2]_x$ polymers serve excellently in this application. Long (>15m) light-yellow polymer fibers can be drawn from a melt of these polymers (at 80-120° C. under an inert atmosphere). After a controlled hydrolytic cure, pyrolysis of such polymer fibers in a stream of NH3 (to 1000° C. at 10° C./min.) yielded white ceramic fibers.

These polymer fibers can be formed by methods that are well known in the art such as melt spinning, dry spinning, etc. In the latter method, a fiber can be pulled from a syrup of the preceramic polymer powder in a polar organic solvent. This fiber maintains its form, and can be cured and then pyrolyzed to give a ceramic fiber. The ceramic fibers typically have a circular cross section, a smooth surface and no obvious major flaws.

These polymers can also be used as binders for ceramic powders, such as, boron carbide, boron nitride, boron phosphides, boron silicides, aluminum boride, aluminum nitride, silicon carbide, silicon nitride and silicon oxynitride.

This invention will be further illustrated by the examples that follow.

A. General Procedure

All manipulations were performed in an inert atmosphere of argon or nitrogen following standard techniques. All solvents were distilled from appropriate drying agents under a nitrogen atmosphere prior to use. All reagents used were available from commercial suppliers and were distilled or sublimed prior to use. Element amine compounds were prepared by published methods, stored in the cold under an atmosphere of inert gas, and distilled prior to use. All new compounds were fully characterized by multinuclear NMR and IR spectroscopic measurements and analytical data. NMR chemical shifts are reported relative to external $F_3B:O-Et_2$ ($^{11}B$), external $Si(CH_3)_4$ ($^{29}Si$), internal solvent ($^{13}C$), or residual $^1H$ in deuterated solvents ($^1H$). Nujol mulls were used for all IR spectra. Ceramic analyses were obtained from Galbraith Laboratories, Knoxville, TN and C, H and N analyses of non-ceramic materials were obtained from Scandinavian Microanalytical Laboratory, Herlev, Denmark. Melting point determinations were performed on samples in sealed tubes.

All NMR measurements were obtained using a Varian XL-300 NMR spectrometer. IR measurements were obtained on a Perkin-Elmer Model 1430 spectrophotometer. DRIFT spectra were recorded in a KBr matrix on an IBM systems instrument. TGA measurements were obtained on a Perkin-Elmer Model TGS-2 equipped with a Thermal Analysis System 4 controller. Lindberg tube furnaces with Eurotherm controllers were used for all preparative-scale pyrolyses. For pyrolyses to 1000° C., 1.5" diameter quartz tubes and fused silica boats were used for all samples (powders and fibers); for pyrolyses to 1500° C., 2.5" diameter mullite tubes and boron nitride boats supported on alumina dee tubes were used. All pyrolyses were carried out under a flowing gas stream. For experiments to 1000° C. a flow rate of ca. 6-8 l/hr was used, for ones to 1500° C. it was ca. 16-20 l/hr. Unless otherwise stated. all pyrolyses performed between 1000-1500° C. were carried out under a flowing argon atmosphere. A Rigaku rotating-anode x-ray powder diffractometer was used to obtain and computer match and simulate diffraction patterns.

B. Synthesis

1. –{
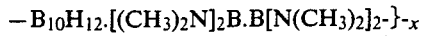
-B$_{10}$H$_{12}$.[(CH$_3$)$_2$N]$_2$B.B[N(CH$_3$)$_2$]$_2$-}-$_x$ A 500 ml Schlenk flask equipped with a rubber septum, a nitrogen inlet tube, and a magnetic stirring bar was charged with 5.00 g of B$_{10}$H$_{14}$ (41 mmol) and 350 ml of Et$_2$O under nitrogen. A solution containing 7.63 g (41 mmol) of [(CH$_3$)$_2$N]$_2$B-B[N(CH$_3$)$_2$]$_2$ in 100 ml of Et$_2$O was added dropwise. During the addition, the reaction mixture changed from colorless to yellow and gas evolution was observed. The reaction mixture was stirred at ambient temperature for 15 hours, during which time a pale yellow precipitate formed. The solvent was removed under reduced pressure. The resulting yellow-orange gummy solid was dried at 60° C. and 0.01 mm Hg for 15 hours. The dark yellow, resinous product, 12.80 g. had a melting range of 70-83° C. It was insoluble in aliphatic hydrocarbons, marginally soluble in aromatic hydrocarbons, and soluble in acetone and MeCN.

Anal. Found: C, 27.86, 25.16; H, 11.58, 11.26; N 15.46, 14.77%. Calcd. for —{-B$_{10}$H$_{12}$(CH$_3$)$_2$N]$_2$B-B[N(CH$_3$)$_2$]$_2$ }$_x$; C, 27.46, H, 11.87; N, 18.30%.

NMR Spectra: $^1$H: δ3.70, 3.62, 3.39, 3.00., all s, {1:1:1:1} (NMe$_2$); 5.0 to −0.9 br (BH)., −3.8 to −4.9 (B-H-B) (DMF-d$_7$). 11$_{B(2JB-H)}$:

δ$_B$ 50-30 (area 2); −7.9 (134, area 1), −8.9 (area 1); −16.3, 19.2 (138), −20.2 (110), −23.1 (159) together area 3; −41.6 (132, area 1) (DMF).

IR 3190 m, 2480 s, 1620 w, 1510 m, 1470 s, 1452 s, 1378 s, 1310 m, 1017 m, 921 m, 798 m. 724 w. 659 m, cm$^{-1}$.

2−{[B$_{10}$H$_{12}$CH$_3$HSi[N(CH$_3$)$_2$]$_2$ }−$_x$

A reaction of 5.00 g (38 mmol) of CH$_3$HSi[N(CH$_3$)$_2$]$_2$ in 50 ml of benzene and 4.62 g (38 mmol) of B$_{10}$H$_{14}$ in 150 ml of benzene was carried out as follows A 500 ml, three-necked round-bottomed flask equipped with an addition funnel containing the benzene solution of the aminosilane, a reflux condenser, a nitrogen inlet tube, and a magnetic stirring bar was charged with the B$_{10}$H$_{14}$ and benzene under nitrogen. The aminosilane solution was added dropwise at ambient temperature. The reaction mixture was stirred at ambient temperature for 2.5 hours after the addition was complete, and at reflux for 48 hours. During the addition the reaction mixture changed from colorless to bright yellow. The solution remained golden orange during heating and some minor (<500 mg) precipitate settled out. After cooling to ambient temperature, the solution was filtered through Celite, and the solvent was removed under reduced pressure. The resulting pale yellow solid residue was dried at ambient temperature at 0.01 mm Hg for 6 hours. The product, ~7g (73%), melted 60-90° C. It was insoluble in aliphatic hydrocarbons and marginally soluble in aromatic hydrocarbons. The $^1$H NMR spectrum of the starting aminosilane gives intergrated resonances of 1.0:3 0:6.0 for Si-H:Si.Me:N-Me, respectively. The product polymer exhibits the same resonances in the approximate ratio of 1.0:5.0:12.0. At this time, no explanation has been found for this observation of an apparent relative loss of resonances attributed to the Si-H functional group. However, it is well-known that the hydrogen atoms of B-H-B 3-center, 2-electron bridging bonds are acidic and that Si-H bonds are reactive toward protonic acids. It is assumed that such acid-base interactions are serving to consume some Si-H functions.

Anal. Found: C, 18.4; H, 9.5; N, 8.1; B, 48.4: Si, 5.3%. Calcd. for —{—$B_{10}H_{12}$.$CH_3HSi[N(CH_3)_2]_2$ }$_x$; C, 23.8; H, 11.1; N, 11.1; B, 42.9; Si, 11.1%.

NMR Spectra: $^1H$: δ4.90 (Si H); 2.24. 2.15, 2.13, 2.00, 1.94. 1.93 (N-Me); 0.51, 0.33, 0.24 (Si-Me) ($C_6D_6$) $^{11}${$^1H$}:δB 5.6, 1.5, 3.2, −9.0, −10.4, 12.9, 14.3, −16.9, −37.9, −41.3 ($C_6D_6$).

IR 3166, 2691, 2507, 2168, 1928, 1566, 1458, 1376, 1262, 1082, 1015, 910, 796, 766, 720 cm$^{-1}$.

3. —{—$B_{10}H_{12}(CH_3)_2Si[N(CH_3)_2]_2$—}—$_x$

A reaction apparatus equipped as described in (2) was charged with 6.00 g (41 mmol) of $(CH_3)_2Si[N(CH_3)_2]_2$ and 5.00 g (41 mmol) of $B_{10}H_{14}$ The contents of the flask were stirred and the $(CH_3)_2Si[N(CH_3)_2]_2$ solution was added dropwise. During the addition the reaction mixture became pale yellow. The reaction mixture was stirred at ambient temperature for 2 hours after the addition was complete and at reflux for 48 hours. After cooling to ambient temperature and filtering through Celite (to remove 200 mg of precipitate), the solvent was removed under reduced pressure. This solution instantaneously becomes cloudy upon exposure to moist air The resulting deep yellow-orange, resinous solid was dried at ambient temperature at 0.01 mm Hg for 4 hours. The product, 8.66 g (79%), melted between 80-110° C. It was insoluble in aliphatic hydrocarbons, partially soluble in aromatic hydrocarbons, and was soluble in DMF and MeCN.

Anal Found: C, 27.4; H. 10.2; N, 10.6., B, 40.3., Si, 9.5%. Calcd. for —{—$B_{10}H_{12}$.$(CH_3)_2Si[N(CH_3)_2]_2$—}$_x$; C, 27.0; H. 11.4;N, 10.5; B, 40.6; Si, 10.6%.

NMR Spectra: $^1H$: after 15 hours under reflux: δ2.20, 2.14 (NMe); 0.22 (SiMe)($C_6D_6$) after 48 hours under reflux:

δ2.09(s), 2.06(s), 1.94(d), 1.87(d) (N-Me, 3.0); 0.20(s,1.0), 0.05(d,0.2) (Si.Me) ($C_6D_6$) $^{11}B${$^1H$}:

δB 16.5, 14.7, 13.3. 10.8, 8.8, 7.4, 4.5, 3.1, 0.0, −1.5, 3.6, −5.9, −15.1, 16.6, −23.6, −31.6, −38.1 ($C_6D_6$) $^{29}Si$: δ$_{Si}$13.35 $^{13}C${$^1H$}:

δ$_C$45.86. 44 94. 39.14 (N-CH3), −4.31 (Si-CH3)

IR 3225, 2500, 1297, 1265, 1075, 905, 808 cm$^{-1}$

The material obtained from this anaerobic treatment is unsuited for melt-spinning of polymer fibers. However, after a brief (<1 minute) exposure to humid (rel. humidity <40%, T~20° C.) air, the material can be melt-spun. A broad IR absorption at 700-1150 cm$^{-1}$, absent in the anhydrous material, is observed in this material. The elemental composition of such moisture-treated material was found to be: C, 26.9; H, 10.3; N, 10.2; B, 37.8., Si, 9.4., 0 (diff), 8.6%. This elemental composition is little changed after the material has been kept molten and used for 0.5 hours as the source for melt-spun fibers. Anal. Found: C, 24.5; H, 10.2; N, 10.4; B 40.0; Si, 7.7; 0 (diff). 7.2%. The polymeric material is rendered infusible when it is heated to temperatures >250° C. Anal. Found: C, 24.3; H. 10.7., N, 11.0; B, 41.9; Si. 4.6., 0 (diff), 7.5%. During this conversion of the initial polymer to infusible material, the only significant change is a slight decrease in the amount of Si, relative to B.

4. —{—$B_{10}H_{12}$.$(CH_2=CH)(CH_3)Si[N(CH_3)_2]_2$}—$_x$

A reaction of 6.49 g (41 mmol) of $(CH_2=CH)(CH_3)Si[N(CH_3)_2]_2$ and 5.00 g (41 mmol) of $B_{10}H_{14}$ was carried out as described in (2). The deep yellow mixture was stirred at ambient temperature for 2 hours and at reflux for 48 hours during which time the solution turned deep orange. After it had been cooled to ambient temperature, the reaction mixture was worked up as described in (2). The resulting orange, foamy solid was dried at ambient temperature at 0.01 mm Hg for 4 hours. The product, 11.03 g (96%( of an orange, resinous solid, softened between 80–90° C. and began to flow; bubbles appeared at 114° C., and it was a liquid with gas evolution from 129-144° C. Vigorous gas evolution occurred at 234° C. It was insoluble in aliphatic hydrocarbons, partially soluble in aromatic hydrocarbons and was soluble in DMF and MeCN.

Anal. Found: C. 32.2; H. 10.8; N, 8.8% Calcd. for —{—$B_{10}H_{12}$.$(CH_2=CH)(CH_3)Si[N(CH_3)_2]_2$—}—$_x$; C, 30.2. H, 10.9; N, 10.1%.

NMR Spectra: $^1H$ δ6.29, 6.24, 6.23, 6.18, 5.89. 5.88, 5.84, 5.83, 5.61 5.60, 5.54, 5.53 (Vi); 2.24, 2.15, 2.14, 1.94. 1.93, 1.91, 1.89, 1.85, 1.83 (N-methyl); 0.27, 0.28 (Si-Me); −2.12 to −2.55, −4.05 to −4.55 (br, B-H-B) $^{13}C${$^1H$}: δ$_C$136.8, 131.0 (Vi); 46.1, 45.8, 45.9, 44.7, 44.6, 39.4 (N-methyl); 26.1, 25.8 ($CH_2$); 1.3, −5.8 (Si-Me) ($C_6D_6$) . $^{11}B${$^1H$}:

δB 24.0, 15.0, 10.0, 5.5, 1.0, −1.0, −2.0, −5.0. −9.0. −14.0, −16.0, −22.5, −37.0 ($C_6H_6$)

IR 3520, 2520, 2430, 2120, 1605, 1565, 1405, 1380, 1305, 1260, 1170, 1140, 685 cm$^{-1}$.

C. Pyrolyses

All materials prepared were characterized by their behavior on pyrolysis.

1. —{—$B_{10}H_{12}$.$[(CH_3)_2N]_2B-B[N(CH_3)_2]_2$—}—$_x$

A 1.00 g sample of the polymer on pyrolysis to 1000° C. under an argon atmosphere produced 0.870 g (87%) of a silver-gray solid. Anal. Found: B, 66 7; C, 16.7; N, 16.3. This corresponds to a nominal formulation of $(B_4C)_{1.00}(BN)_{0.93}(C)_{0.11}$. A 1.00 g sample of the polymer, when pyrolyzed to 1000° C. under an ammonia atmosphere gave 0.86g (86%) of a hard, white solid, which appeared to have fused during pyrolysis.

Anal Found: B. 38.2; N, 51.2; C, 0.2; H, 0.9. This corresponds to a nominal formulation of $(BN)_{1.00}(B_4C)_{0.006}(NH_3)_{0.2}$. In weight percent, this is equivalent to 99.0% pure BN.

2. —{—$B_{10}H_{12}$.$CH_3HSi[N(CH_3)_2]_2$—}—$_x$

A 1.211 g sample of the compound, when pyrolyzed to 1000° C. under ammonia, produced 1.030 g (85%) of a white free-flowing foamy solid. Anal. Found: C. 0.8: H, 0.9; N, 55.8; B, 32.9; Si, 3.8%. Further heating to 1500° C. of a 0.5163 g sample of the material thus produced yielded 0.4704 g (91%) of a white powder. The only crystalline phase observed was BN. Anal. Found: C, 0.8; B. 39.6., Si, 4.5; N. 52.9%.

3. —{—$B_{10}H_{12}$.$(CH_3)_2Si[N(CH_3)_2]_2$—]—$_x$

A 0.852 g sample, when pyrolyzed to 1000° C. under an argon atmosphere, produced 0.724 g (85%) of a lusterous, black residue that contained only crystalline BN by XRD. Anal. Found: C, 18.0; B, 57.9., Si, 6.4; N. 11.8., H. 1.0%. Further heating to 1500° C. of a 0.500 g sample of the material thus produced yielded 0 485 g (97%) of a fine, black powder. The crystalline phases observed were BN and minor amounts of an unidentified phase which did not match with any of the reported nitrides or carbides of either boron or silicon. Anal.

Found: C, 19.4.B, 57.6; Si, 10.0; N, 12.9%. A 1.02 g sample of the precursor, when pyrolyzed to 1000° C. under ammonia, produced 0.908 g (89%) of a white foamy solid. Anal. Found: C, 0.6; B, 39.8; Si. 2.1; N, 55.4; H, 0.8%. The crystalline phases observed were BN and minor amounts of the above-described unidentified phase. Further heating to 1500° C. of a 0.500 g sample of the material thus produced yielded 0.460 g (92%) of a very light grey powder. The only crystalline phases observed were BN and the above described unidentified phase. Anal. Found: C, 0.3, B. 40.9; Si, 4.1; N. 54.7%. This corresponds to a nominal formulation of $(BN)_{1.000}(Si_3N_4)_{0.008}(Si)_{0.004}$.

4. $—\{—B_{10}H_{12}.(CH_2=CH)(CH_3)Si[N(CH_3)_2]_2—\}—_x$

A 0.300 g sample of the polymer, when pyrolyzed to 1000° C. under an argon atmosphere, produced 0.219 g (73%) of a lusterous, black residue that gave evidence of melting during pyrolysis. Anal. Found: C, 21.4; B, 54.7; Si, 12.7; N, 10.4%. The only crystalline phase present by XRD was BN. Further heating to 1500° C. of a 0.300 g sample of the material thus produced yielded 0.282 g (94%) of a fine, black powder. Anal. Found: C, 23.1, B, 51.8., Si, 12.9; N, 11.6%. A 0.250 g sample of the precursor, when pyrolyzed to 1000° C. under ammonia, produced 0.213 g (85%) of a white solid that gave evidence of melting during pyrolysis. Anal. Found: C. 0.82; B, 34.8; Si, 7.8; N. 56.1%. The only crystalline phases observed were BN and the unidentified phase mentioned in (3). Further heating to 1500° C. of a 0.200 g sample of the material thus produced yielded 0.182 g (91%) of a white powder. The only crystalline phase observed was BN (broad lines). Anal. Found: C, 0.6: B, 29.7; Si, 19.1; N, 50.3%.

D. Applications

1. General Procedure for Producing Ceramic Fibers

In a typical experiment, 0.5.2.0 g of the polymer was placed, in an inert-.atmosphere box, in a 250 ml Schlenk flask equipped with a rubber septum. After removal from the inert-atmosphere box, the flask containing the polymer was partly submerged in a sand bath in a heating mantle and slowly heated under an argon atmosphere until the polymer visibly softened. The septum was removed, and fibers were drawn using a glass rod dipped into the molten polymer and withdrawn manually at a rate which produced suitably shaped fibers. The bath temperature was maintained (within ±10° C.) and fibers were drawn until the molten polymer began to show signs of decomposition (significant thickening), presumably due to exposure to small amounts of atmospheric oxygen and/or water vapor. The polymer fibers were harvested in air using scissors and were stored in an inert-atmosphere box until pyrolzyed to prevent any reaction with water or atmospheric oxygen.

2. Preparation and Pyrolysis of $—\{—B_{10}H_{12}.[(CH_3)_2N]_2B-B[N(CH_3)_2]_2—\}—_x$ Fibers Following the general procedure outlined above for formation of $—\{—B_{10}H_{12}.L\ L—\}—_x$ fibers, fibers of $—\{—B_{10}H_{12}(Me_2N)_2B-B(NMe_2)_2\}—_x$ were successfully pulled, under an argon atmosphere, from a melt of 5 g of $—\{—B_{10}H_{12}.(Me_2N)_2B-B(NMe_2)_2\}—_x$ maintained at a temperature of 60–100° C. The orange polymer resin was heated from ambient temperature (ca. 10° C./min) and began to soften at about 60° C. The polymer adhered to the interior of the flask (65–80° C.). and the homogeneous, viscous, yellow-orange molten polymer flowed to the bottom of the flask (80–85° C.). When the bath temperature reached 90° C., a stir-bar rotated freely in the molten polymer which had the consistency of a thick syrup. The melt was probed with a glass rod and well-formed pale yellow fibers (~2 meters in length) were withdrawn The bath temperature was maintained between 80–95° C. and fibers were drawn for approximately one hour, harvested in air with scissors, and stored under an inert atmosphere until pyrolyzed. Polymer fibers decomposed in air after ca. two days. In a subsequent experiment, the bath temperature was raised to higher values to determine the stability of the polymer melt. The molten polymer became too thick to allow free movement of the magnetic stirring bar at ~150° C. Polymer fibers which were exposed to ammonia at ambient temperature reacted to produce a bubbly mass within <5 minutes. When polymer fibers were heated to 200° C. in an argon atmosphere, no intact fibers remained.

3. Preparation and Pyrolysis of $—\{—B_{10}H_{12}.(CH_3)(H)Si[N(CH_3)_2]_2—\}—_x$ Fibers Following the general procedure outlined above, fibers of $—\{—B_{10}H_{12}.(CH_3)(H)Si[N(CH_3)_2]_2—\}—_x$ were successfully pulled, under an argon atmosphere from a melt of $—\{—B_{10}H_{12}.(CH_3)(H)Si[N(CH_3)_2]_2—\}—_x$ (~2 g), maintained at 90±10° C. The orange, resinous polymer was heated at a rate of 5° C./min The melt was probed with a glass rod and fibers were withdrawn to a length of 2 m. Fibers were drawn for approximately 30 minutes and harvested in air with scissors. In a subsequent experiment, the bath temperature was raised in order to monitor the stability of the polymer melt. In the absence of air, the molten polymer is stable at 150° C.

Polymer fibers which were exposed to a flowing stream of ammonia at ambient temperature reacted within <5 minutes to produce a bubbly mass. Polymer fibers which were heated in a flowing stream of argon remelted below 100° C. Thus, a cure was needed for the polymer fibers. It was found that maintaining them at 16–22° C. and 20% relative humidity for 0.5 to 24 hours was a suitable cure. Subsequent pyrolysis to 1000° C. (10° C./minute, ammonia atm) gave white ceramic fibers. SEM analysis showed the fibers to be 10–20μ in diameter. smooth surfaced spherical, and flawed at a level <0.5 μ.

4. Preparation and Pyrolysis of $—\{—B_{10}H_{12}.(CH_3)_2Si[N(CH_3)_2]_2—\}—_x$ Fibers Following the general procedure outlined above, fibers of $—\{B_{10}H_{12}.(CH_3)_2Si[N(CH_3)_2]_2—\}—_x$ were successfully pulled, under an argon atmosphere, from a melt of $—\{B_{10}H_{12}.(CH_3)_2Si[N(CH_3)_2]_2—\}—_x$ (~2 g), maintained at 100 ±10° C. The yellow-orange, ressinous polymer was heated at a rate of 5° C./minute. The melt was probed with a glass rod and fibers were withdrawn to a length of greater than 5 m. Fibers were drawn for approximately 20 minutes and harvested in air with scissors. In a subsequent experiment, the bath temperature was raised to higher values in order to monitor the stability of the polymer melt In the absence of air, the molten polymer is stable at 150° C.

Polymer fibers which were exposed to a flowing stream of ammonia at ambient temperature reacted within <5 minutes to produce a bubbly mass. Polymer fibers which were heated in a flowing stream of argon remelted below 1000° C. Thus, a cure was needed for the polymer fibers. It was found that maintaining them at 15-20° C. and 40% relative humidity for 3 hours or longer was a suitable cure. Pyrolysis to 1000° C. (10° C./minute, ammonia atm) gave white ceramic fibers. SEM analysis showed the fibers to be 20μ in diameter, rough surfaced, partially spherical, and flawed at a level ~1μ.

This invention has been described in detail with reference to the preferred embodiments thererof. However, it will be appreciated that those skilled in the art upon consideration of this disclosure may make modifications and improvements within the scope and spirit of the invention as described in the claims.

We claim:

1. A preceramic polymer soluble in an organic solvent formed by reacting (a) $B_{10}H_{14-n}R_n$, where R is a lower alkyl group having from 1 to about 8 carbon atoms. a substituted or unsubstituted cycloalkyl group having from 3 to about 8 carbon atoms. a substituted or unsubstituted lower alkenyl group having from 2 to about 8 carbon atoms, or a substituted or unsubstituted lower aryl group having from 6 to about 10 carbon atoms, and n is a number from zero to about six, with (b) a diamine of the formula
   $R^1R^2N\text{-}(E)_q\text{-}NR^4R^5$, where $R^1$, $R^2$, $R^4$ and $R^5$ are H. a lower alkyl group having from 1 to about 8 carbon atoms, a substituted or unsubstituted cycloalkyl group having from 3 to about 8 carbon atoms a substituted or unsubstituted lower alkenyl group having from 2 to about 8 carbon atoms, a substituted or unsubstituted lower aryl group having from 6 to about 10 carbon atoms, or a di- or triorganosilyl group, $R^1$, $R^2$, $R^4$ and $R^5$ can be the same or different, E is a difunctional substituted or unsubstituted heteroatom-containing group q is a number 1 or greater, in an organic solvent for a sufficient time to form said preceramic polymer.

2. The polymer of claim 1 wherein the substituents for E are H, a lower alkyl group having from 1 to about 8 carbon atoms, a substituted or unsubstituted cycloalkyl group having from 3 to about 8 carbon atoms, a substituted or unsubstituted lower alkenyl group having from 1 to about 8 carbon atoms, a substituted or unsubstituted cycloalkenyl group having from 3 to about 8 carbon atoms, a substituted or unsubstituted lower alkynyl group having from 2 to about 8 carbon atoms, a substituted or unsubstituted lower aryl group having from 6 to about 10 carbon atoms, a substituted or unsubstituted heterocyclic group, a substituted or unsubstituted amino group and a substituted or unsubstituted alkoxy group having 2 to 10 carbon atoms.

3. The polymer of claim 2, wherein $R^1$ and $R^2$ are the same, and $R^4$ and $R^5$ are the same or wherein $R^1$ and $R^4$ are the same and $R^2$ and $R^5$ are the same.

4. The polymer of claim 2, wherein when $R^1$, $R^2$, $R^4$ and $R^5$ are $CH_3$.

5. The polymer of claim 2, wherein E is Si, B, Ge, Al.

6. The polymer of claim 2, wherein q is 1 to 3.

7. The polymer of claim 1, wherein the diamine is selected from the following classes of diamines:

$$R_2^aN\text{—}\underset{\underset{Me}{|}}{\overset{\overset{Me}{|}}{E}}\text{—(ORG)—}\underset{\underset{Me}{|}}{\overset{\overset{Me}{|}}{E}}\text{—}NR_2^a; \quad (1)$$

$$R_2^aN\text{—}E\underset{R'}{\overset{(ORG)}{\diagup\diagdown}}\underset{(ORG)}{\overset{R'}{\diagdown\diagup}}E\text{—}NR_2^a \quad (2)$$

$$\begin{array}{c}Me_2\\|\\E\\\diagup\;\diagdown\\R^aN\quad\;NR^a;\text{ and}\\\diagdown\;\diagup\\E\\|\\Me_2\end{array} \quad (3)$$

$$\begin{array}{c}Me_2\quad Me_2\\|\quad\;\;|\\E\text{——}E\\\diagup\quad\;\;\diagdown\\R^aN\quad\quad\;NR^a\\\diagdown\quad\;\;\diagup\\E\text{——}E\\|\quad\;\;|\\Me_2\quad Me_2\end{array} \quad (4)$$

where $R^1$ and $R'$ are defined as $R^1$, $R^2$, $R^3$ and $R^4$ and ORG=R, a difunctional alkylene, alkenylene, alkynylene, heteroatom, heteroatom substituted R, or ORG may not be present.

8. The polymer of claim 7, wherein E is Si or Ge.

9. The polymer of claim 2, wherein E is $R^b$-B or $R^b$-Al where $R^b$ is H or a lower alkyl group having from one to about 8 carbon atoms.

10. The polymer of claim 2, wherein the diamine has the formula $R^1R^2N\text{-}(E)_q\text{-}(E^1)_{q^1}\text{-}NR^4R^5$, wherein $E^1$ is defined as E. but $E^1{\neq}E$, and q and $q^1$ are 1 to 3.

11. The polymer of claim 2, wherein the diamine is a mixture of different diamines of the formula $R^1R^2N\text{-}(E)_q\text{-}NR^4R^5$.

12. The polymer of claim 11, wherein the E's of the mixture of diamines differ.

13. The polymer of claim 2, wherein the diamine is a mixture of diamines of the formulas $R^1R^2N\text{-}(E)_q\text{-}NR^4R^5$, and at least one of $R^1R^2N\text{-}(E^1)_q\text{-}NR^4R^5$ and $R^1R^2N\text{-}R^3\text{-}NR^4R^5$, where $E^1$ is defined the same as E, but $E^1/E$, and $R^3$ is a lower alkenylene group having from 1 to about 8 carbon atoms, a substituted or unsubstituted cycloalkylene group having from 3 to about 8 carbon atoms, a substituted or unsubstituted lower alkenylene group having 2 to about 8 carbon atoms, a substituted or unsubstituted lower arylene group having from 6 to about 10 carbon atoms a substituted or unsubstituted polyarylene group, a heteroatom-containing alkylene, cycloalkylene, alkenylene or arylene group.

14. A ceramic material formed from the pyrolysis of the preceramic polymer of claim 2.

15. A ceramic material formed from the pyrolysis of the preceramic polymer of claim 5.

16. A method of forming fibers comprising forming a fiber from the preceramic polymer of claim 2 in a polar organic solvent which is at a temperature below 200° C.

17. The method of claim 16, wherein the fibers are formed by "dry spinning".

18. The method wherein the fibers are formed by melt-spinning.

19. The polymer of claim 7, wherein ORG is the lower alkyl group, O, or NR.

20. The polymer of claim 7, wherein ORG is not present.

* * * * *